US007128961B2

(12) United States Patent
Kai et al.

(10) Patent No.: US 7,128,961 B2

(45) Date of Patent: Oct. 31, 2006

(54) HONEYCOMB STRUCTURE, METHOD FOR MANUFACTURING HONEYCOMB STRUCTURE, AND EXHAUST GAS PURIFICATION SYSTEM USING HONEYCOMB STRUCTURE

(75) Inventors: Ryuji Kai, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 133 days.

(21) Appl. No.: 10/673,497

(22) Filed: Sep. 30, 2003

(65) Prior Publication Data

US 2004/0071931 A1 Apr. 15, 2004

(30) Foreign Application Priority Data

Oct. 10, 2002 (JP) ............................ 2002-297713

(51) Int. Cl.
*B32B 3/12* (2006.01)

(52) U.S. Cl. ...................... 428/116; 428/117; 428/118; 428/313.3; 428/314.2

(58) Field of Classification Search ........ 428/116–118, 428/313.3, 314.2
See application file for complete search history.

(56) References Cited

U.S. PATENT DOCUMENTS 5,566,545 A 10/1996 Hijikata et al.
5,855,781 A * 1/1999 Yorita et al. ........... 210/321.82
6,248,689 B1 6/2001 Manson

FOREIGN PATENT DOCUMENTS

| | | |
|---|---|---|
| EP | 0 134 002 A 1 | 3/1985 |
| EP | 0 736 503 A1 | 10/1996 |
| EP | 1 219 794 A 1 | 7/2002 |
| JP | U 60-112618 | 7/1985 |
| JP | A 08-28247 | 1/1996 |
| JP | A 2001-50028 | 2/2001 |
| JP | A 2002-119867 | 4/2002 |
| WO | WO 93/21429 | 10/1993 |

* cited by examiner

*Primary Examiner*—Ling Xu
(74) *Attorney, Agent, or Firm*—Oliff & Berridge, PLC

(57) ABSTRACT

There is disclosed a honeycomb structure which can be used as a filter for trapping/collecting particulates included in an exhaust gas and in which it is possible to remove ashes deposited inside without requiring any special mechanism or apparatus or without being detached from the exhaust system. The structure comprises a plurality of through channels 9 extending to an axial direction of a honeycomb structure, porous partition walls 7 separating through channels one another, and plugging portions 11; said plugging portion plugging predetermined through channels 9*a* at one end and the rest of through channels 9*b* at other end opposite to the plugged end of the predetermined through channels, wherein at least a part of predetermined crossing portions of the porous partition walls is discontinued to form a void portion 17 in each of the predetermined crossing portions.

13 Claims, 8 Drawing Sheets

HONEYCOMB STRUCTURE, METHOD FOR MANUFACTURING HONEYCOMB STRUCTURE, AND EXHAUST GAS PURIFICATION SYSTEM USING HONEYCOMB STRUCTURE

BACKGROUND OF THE INVENTION

1. Field of the Invention

The present invention relates to a honeycomb structure for use in a filter for trapping/collecting particulates in an exhaust gas of an internal combustion engine, boiler, and the like, a method for manufacturing the honeycomb structure, and an exhaust gas purification system using the honeycomb structure.

2. Description of the Related Art

An exhaust gas exhausted from internal combustion engines such as a diesel engine contains a large amount of particulates (particulate materials) containing carbon which causes pollution as a major component. Therefore, a filter for trapping/collecting the particulates is sometimes mounted in an exhaust system.

In general, as a filter to be used for this purpose, as shown in FIG. 8(*a*) and FIG. 8(*b*), one usually uses a honeycomb structure including a plurality of through channels 9, porous partition walls 7 separating through channels one another; said through channels extending to an axial direction of the honeycomb structure, and plugging portions 11 plugging the predetermined through channels 9*a* at one end face, and the rest of the through channels 9*b* at other end opposite to the plugged end of the predetermined through channels 9*a*.

The exhaust gas flows in the filter made of such a honeycomb structure mentioned above via one end face 3 thereof, and the gas flows out of the other end face 5 after the particulates included in the gas are removed. Concretely, the exhaust gas first flows in the through channels 9*b* whose ends are not plugged at the end face 3 on an inflow side and whose other ends are plugged at the end face 5 on an outflow side, moves through the porous partition walls 7 into the through channels 9*a* whose ends are plugged in the inflow-side end face 3 and whose other ends are not plugged in the outflow-side end face 5, and flows out via the through channels 9*a*. Moreover, in this case, the partition walls 7 function as filter layers, and the particulates in the gas are captured by the partition walls 7 and deposited on the partition walls 7.

After the use of the filter for a given period of time, the particulates deposited in the filter are burned with heating the filter by electric conduction of an electric heater to be removed, but are not completely removed, and some of the particulates remain as ashes (ash component) within the filter. Therefore, with the use of the filter over a long period of time, a filter capacity substantially decreases by the deposition of the ashes, pressure loss increases, and an amount of particulates to be trapped/collected decreases. There has therefore been a problem that frequency for regeneration treatment of the filter by burning/removing the captured particulate materials as described above have to be increased.

To solve the problem, for example, there has been proposed an apparatus in which the filter is supported in a direction vertical to the direction of the gas flow, and said apparatus having a vibration device provided to the filter, and an ash collecting portion provided at lower portion of the filter for collecting the ashes dropping off the filter by virtue of vibration applied to the filter by the vibration device (see JP-A-8-28247).

Moreover, there has been proposed a method in which a highly pressurized fluid such as water is sprayed onto one end of the filter to clean/remove the residue after burning resided in the filter (see JP-A-2001-50028).

Furthermore, there has been proposed a device for discharging ashes with employing a filter a part of whose partition walls has been removed (see Japanese Utility Model Application Laid-Open No. 60-112618).

However, any one of those techniques proposed has not been very practical. For example, the device proposed in the above-mentioned Laid-open Japanese Utility Model application can not be used practically since a trapping/collecting efficiency of particulates during the use is low because the hole portion formed by removing a part of the partition wall was apt not to be closed. Moreover, a special mechanism or apparatus is required to remove the ashes from the filter in some case, or the filter needs to be detached tentatively from the exhaust system to remove the ashes from the filter in the other case. Therefore, the conventional apparatus or method has not been practical.

SUMMARY OF THE INVENTION

The present invention has been completed in consideration of such conventional situations, and an object thereof is to provide a honeycomb structure capable of using as a filter for trapping/collecting particulates included in an exhaust gas with removing ashes deposited inside without requiring any special mechanism or device or without being detached from an exhaust system.

According to the present invention, there is provided a honeycomb structure comprising: a plurality of through channels extending to an axial direction of a honeycomb structure, porous partition walls separating from one another, and plugging portions; said plugging portions plugging the predetermined through channels at one end thereof and the rest of through channels at other end opposite to the plugged end of the predetermined through channels, wherein at least a part of crossing portions of predetermined porous partition walls is discontinued to form a void portion in each of the predetermined crossing portions (first aspect of the invention).

Hereinafter, the expression "void portion" is used in the present specification to mean a (the) void portion formed in the portion where the partition walls were to have crossed at a predetermined angle.

Moreover, according to the present invention, there is provided a method for manufacturing the honeycomb structure according to the first aspect of the invention, comprising the steps of: preparing a die for extrusion molding of a honeycomb structure capable of extruding a honeycomb structure having a plural number of void portions in partition walls at a predetermined position, and extruding a honeycomb structure having an intended structure using said die (second aspect of the invention).

Furthermore, according to the present invention, there is provided an exhaust gas purification system for trapping/collecting/removing particulate materials containing carbon as a major component included in dust-containing fluids such as an exhaust gas of an internal combustion engine, the system comprising: the honeycomb structure according to the first aspect of the invention, which is used as a filter for trapping/collecting the particulate materials; and heating means for burning the particulate materials trapped/collected by the honeycomb structure to regenerate a filtering capacity, wherein void portions in partition walls of the honeycomb structure have such a structure that the void portions are substantially closed due to the accumulation of trapped/collected particulate materials during practical use, thus closed void portions are substantially reopened when the captured particulate materials are burnt by heating the filter at the time of the regeneration, and at least some of unburnt materials such as ashes deposited in the honeycomb structure are discharged via the reopened void portions from the honeycomb structure with flow of dust-containing fluids, when the void portions are reopened (third aspect of the invention).

The following numerical references in the accompanying drawings denote the portion and/or the member as specified below, respectively: 3 . . . end face from which the exhaust gas flows in, 5 . . . end face from which the exhaust gas flows out, 7 . . . partition wall, 9 . . . through channel, **9*a* . . . through channel, 9*b* . . . through channel, 11 . . . plugging portion, 17 . . . void portion in crossing portion, 21** . . . particulates.

DESCRIPTION OF THE PREFERRED EMBODIMENT

Figure 1:
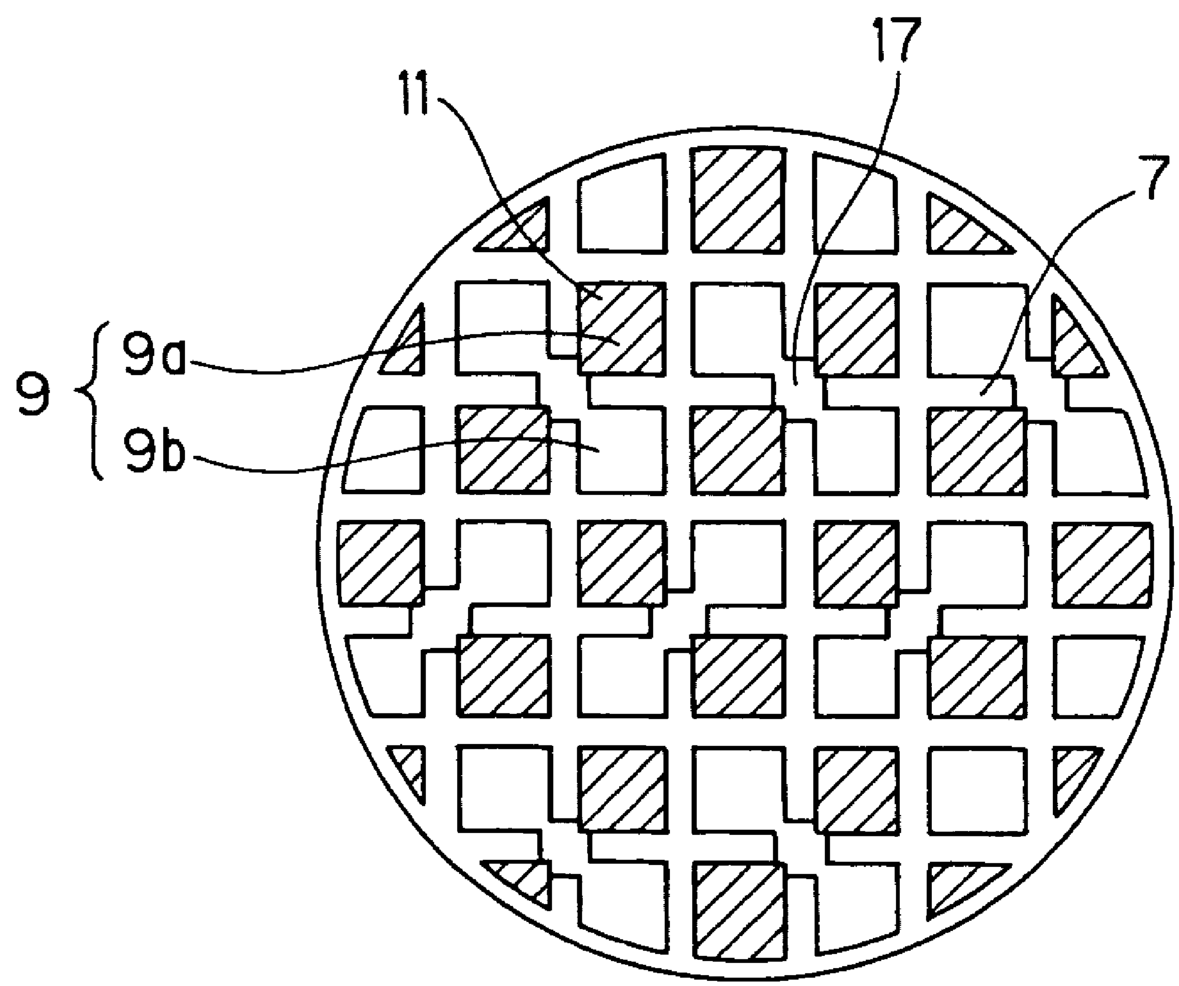
FIG. 1 is a schematic plan view showing one example of an embodiment of a honeycomb structure according to a first aspect of the invention as seen from an end-face side.

FIG. 1 is a schematic plan view showing one example of an embodiment of a honeycomb structure according to a first aspect of the invention as seen from an end-face side. A basic structure of the honeycomb structure according to the first aspect of the invention includes: a plurality of through channels 9 extending to an axial direction of a honeycomb structure, porous partition walls 7 separating through channels one another and plugging portions 11; said plugging portions plugging predetermined through channels **9*a* at one end, and the rest of through channels 9*b* at other end opposite to the plugged end of the predetermined through channels 9*a***.

Moreover, as a common characteristic structure, there is formed a void portion 17 each in at least a part of each of the predetermined crossing portions of porous partition walls 7.

Figure 2:
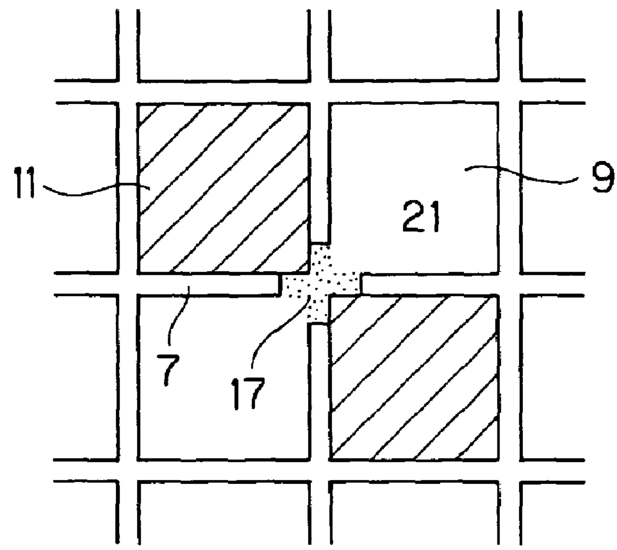
FIG. 2 is a partial plan view showing that a void portion is closed by particulates.

When the honeycomb structure constituted in this manner is used as a filter for trapping/collecting particulates included in an exhaust gas of internal combustion engines such as a diesel engine, some of the particulates in the exhaust gas pass through the void portions 17 at a stage immediately after the initiation of the practical run as a filter. Therefore, as compared with a conventional filter having no void portion, a trapping/collecting efficiency drops at this stage. However, as shown in FIG. 2, since trapped/collected particulates 21 are deposited, the void portions 17 are substantially brought into closed states in a short time. Thereafter, the same degree of the trapping/collecting efficiency as that of the conventional filter can be attained.

Figure 3:
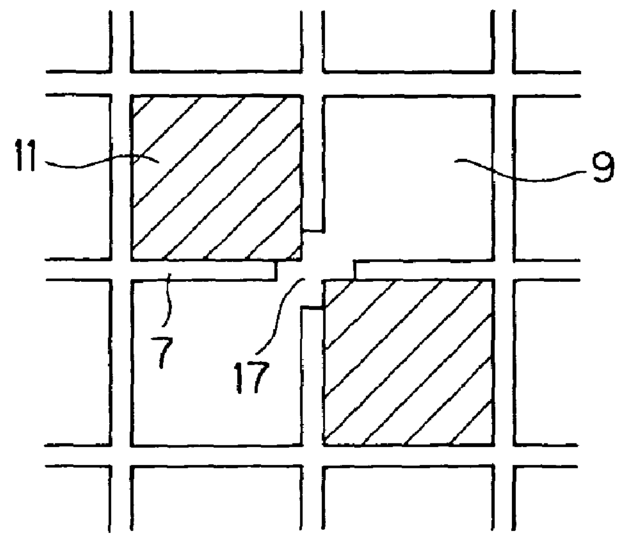
FIG. 3 is a partial plan view showing that the void portion is open.

Subsequently, when a given amount of trapped/collected particulates 21 are deposited in the filter, a regeneration treatment is carried out by burning/removing the captured particulates 21 with heating the filter by a heater, and the like. By this regeneration treatment, as shown in FIG. 3, the void portion 17 plugged with the captured particulates returns again to a substantially open state.

When the void portion 17 becomes an opened state in this manner, residual ashes formed as a result of burning the captured particulates in the filter are discharged to the outside via the void portion 17 with a flow of the exhaust gas, and the filter returns to a clean state substantially equal to that at the time of initiating to use the honeycomb structure as a filter. When a series of cycle "the trapping/collecting of the particulates→the burning/removing of the captured particulates by the regeneration treatment→the discharging of the residual ashes" is repeated in this manner, the ashes deposited inside can be removed without requiring any special mechanism or apparatus or without temporarily detaching the filter from an exhaust system for removal of particualtes, in the case of the present honeycomb structure.

Figure 4:
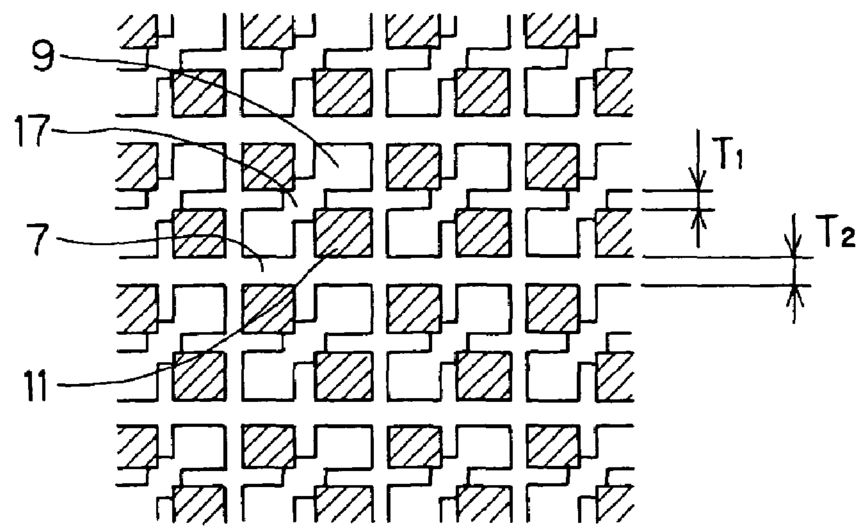
FIG. 4 is a schematic diagram showing one example of arrangement of void portions.
Figure 5:
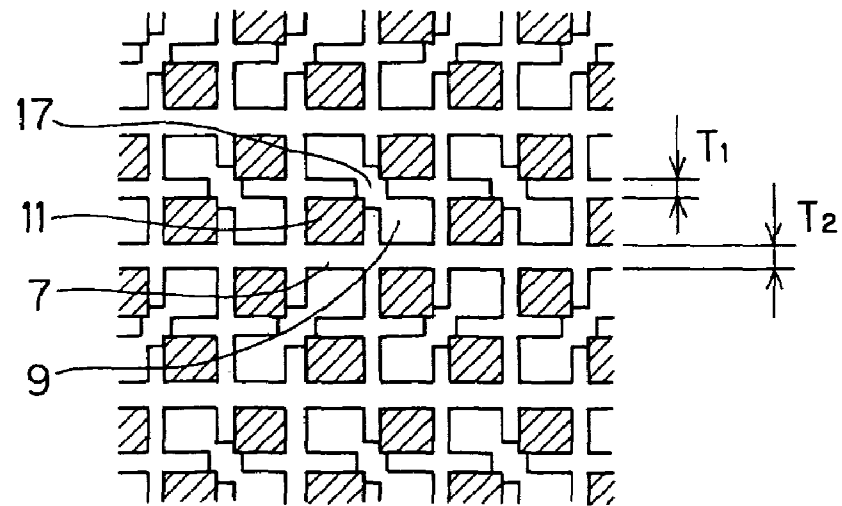
FIG. 5 is a schematic diagram showing another example of the arrangement of the void portions.

In the honeycomb structure according to the first aspect of the invention, the void portions 17 are preferably formed along the whole length of the honeycomb structure so as to smoothly discharge the ashes when the void portions 17 are reopened. Moreover, as shown in FIGS. 4 and 5, the void portions 17 are preferably regularly arranged/formed at predetermined crossing portions of partition walls, thereby fluctuations of strength in each portion of the honeycomb structure can be reduced.

Figure 7:
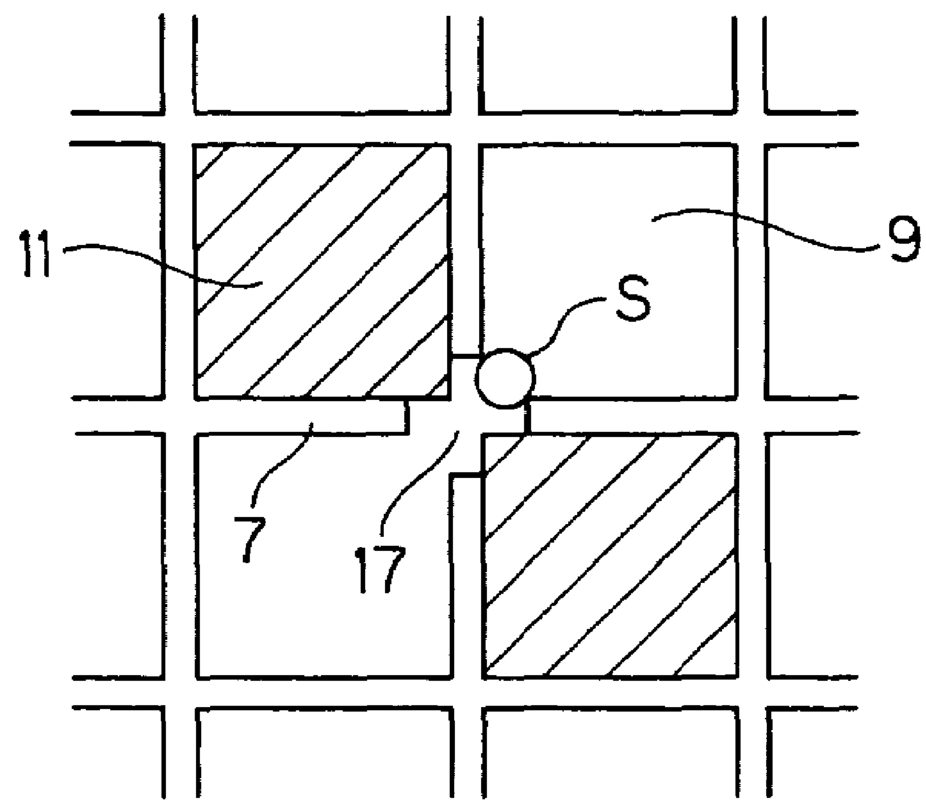
FIG. 7 is an explanatory view for defining terms "gap" and "gap width" in the present invention.

A gap width in the void portion 17 is preferably 0.2 to 1 mm, more preferably 0.4 to 0.8 mm. It is to be noted that the expression "the gap in the void portion" in the present specification and the accompanying claims means a cut portion formed between two partition walls 7 to be crossed to partition the through channel 9 of FIG. 7 due to the formation of the void portion 17 as shown in FIG. 7. The "gap width" refers to a diameter of a minimum circle (minimum inscribed circle) S inscribed with the gap in the void portion in the plane vertical to the extending direction of the through channel 9.

When the gap width is less than 0.2 mm, it is sometimes difficult to discharge the ashes even in the reopened state of the void portions 17. On the other hand, when the gap width exceeds 1 mm, a long time is required until the trapped/collected particulates 21 plug the void portions sufficiently, and the trapping/collecting efficiency largely drops at this time.

When there are present void portions 17 in the crossing portion of partition walls as described above, the trapping/collecting efficiency temporarily drops just after the initiation of the run or the regeneration treatment as compared with the honeycomb structure having no void portion. However, when the gap in the void portion 17 is set to the above-described range, the void portion 17 is closed due to the deposition of the particulates 21 within a short time. Therefore, there is no practical problem, when the average trapping/collecting efficiency in the run for a given period of time is taken into consideration, since the difference in the efficiency between the honeycomb structure having the void portions 17 and the one having no void portion is slight.

When the honeycomb structure according to the first aspect of the invention is used for the filter for trapping/collecting the particulates included in the exhaust gas of the internal combustion engine, the filter is usually disposed in the exhaust gas system in such a manner that the center of an exhaust gas flow passes through the central portion of the section of the honeycomb structure. Therefore, as compared with the flow speed of the exhaust gas in the central portion, that of the exhaust gas flowing at the vicinity of an outer peripheral portion of the honeycomb structure tends to be slow.

If there is a portion wherein the flow speed of the exhaust gas is slow as mentioned above, the ashes in the portion wherein the flow speed of the exhaust gas is slow are not easily discharged as compared with those in the other portions. Therefore, instead of setting all the gap widths of the void portions to be uniform, the gap widths may substantially be set to be nonuniform, in accordance with the flow speed of the exhaust gas in each portion. For example, in the above-described example, the flow speed of the exhaust gas at the vicinity of the outer peripheral portion of the honeycomb structure decreases. Therefore, it is preferable to set the gap width in the void portions in the slower flow speed portion larger than that of the void portion in the central portion seen from the side of an end face of the honeycomb structure, so that the ashes are easily discharged.

Moreover, in the first aspect of the invention, in order to enhance strength (isostatic strength) of the honeycomb structure as a whole, the thickness of the partition walls having no void portion and extending to the predetermined direction without having the discontinued portions is 1.05 to 1.5 times, more preferably 1.1 to 1.3 times that of the partition walls having the void portion and consequently having the discontinued portion in the crossing portions of partition walls crossing at right angles each other to the length direction of the honeycomb structure.

For example, in the embodiments shown in FIGS. 4 and 5, in the section of the honeycomb structure crossing at right angles to the length direction, the thickness $T_2$ of the partition wall having no void portion 17 and extending without having discontinued portion in an X-direction (lateral direction of the drawing) is set to be larger than the thickness $T_1$ of the partition wall having the void portion 17 and discontinued portion defined by the void portion 17. By employing this constitution, the strength of the honeycomb structure in the X-direction can be enhanced.

Figure 6:
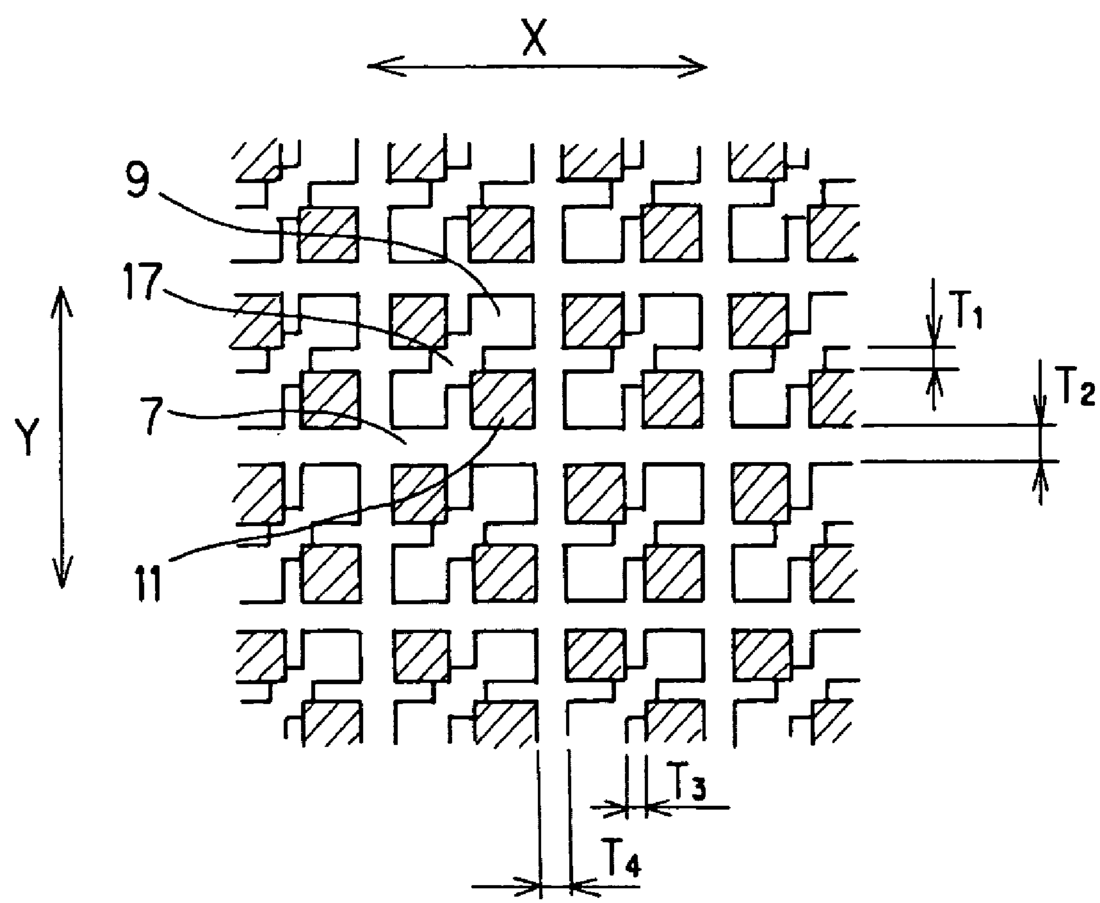
FIG. 6 is a schematic diagram showing an example in which a thickness of a partition wall is changed.

Moreover, as shown in FIG. 6, the thickness $T_2$ of the partition wall having no void portion 17 extending to the X-direction (lateral direction of the drawing) without having discontinued portion is set to be larger than the thickness $T_1$ of the partition wall having the void portion 17 and discontinued portion defined by the void portion 17. Furthermore, the thickness $T_4$ of the partition wall having no void portion 17 and extending to the Y-direction (longitudinal direction of the drawing) without having discontinued portion may also be set to be larger than the thickness $T_3$ of the partition wall having the void portion 17 and discontinued portion defined by the void portion 17. In this case, the strengths of the honeycomb structure in both the X and Y-directions can be enhanced.

If thickness $T_2$, $T_4$ of the partition wall having no void portions 17 and extending to the predetermined direction without having discontinued portion is less than 1.05 times the thickness $T_1$, $T_3$ of the partition wall having the void portion 17 and discontinued portion defined by the void portion 17, the strength enhancement effect of the honeycomb structure is low. On the other hand, if exceeds 1.5 times, a difference is generated in a through resistance of the exhaust gas between the thickened partition wall and the not-thickened partition wall, and the pressure loss or the trapping/collecting efficiency of the particulates is sometimes adversely affected.

A sectional shape (cell shape) of the through channel is not especially limited, but from a viewpoint of manufacturing, any shape of a triangular shape, a quadrangular shape, a hexagonal shape, and circular shape is preferable. When the sectional shape of the through channel is the quadrangular shape, it is preferable to form the void portions 17 regularly at every other crossing portion of partition walls in the crossing portions of partition walls disposed adjacent to one another as shown in FIG. 4 or 6. Moreover, it is preferable to have only one gap formed by the void portion 17 in each of predetermined through channels 9, from a viewpoint of balancing the strength of the honeycomb structure or easiness of discharging the ashes. Furthermore, the sectional shape of the honeycomb structure is not especially limited. In addition to the circular shape, any shape can be used such as an elliptic shape, oblong shape, oval shape, substantially triangular shape, substantially quadrangular shape, and another polygonal shape.

For a material of the honeycomb structure, from a viewpoint of strength or heat resistance, any one having as a major crystal phase selected from the group consisting of cordierite, silicon carbide, silicon nitride, alumina, mullite, and lithium aluminum silicate (LAS) is preferably used. It is preferable to form the plugging portion from the same material as that of the honeycomb structure because the coefficients of thermal expansion of them coincide each other.

Application of the honeycomb structure according to the first aspect of the invention is not especially limited. As described above, however, it is most preferable to use it as a filter, with utilizing a filtering capacity of partition walls for separating through channels, for trapping/collecting/removing the particulates (particulate materials) included in dust-containing fluids such as the exhaust gas of the internal combustion engine, thereby the characteristics of the structure can be fully utilized.

Next, a method for manufacturing the honeycomb structure according to the present invention will be described noting the formation of the void portions which are characteristic portions of the honeycomb structure.

In the method for manufacturing the honeycomb structure according to a second aspect of the invention, one should prepare a die for extruding a honeycomb structure having an intended construction. One possible preparation way is to close the predetermined crossing portions of the slits for forming partition walls in a die for extruding/molding a honeycomb structure to form the void portions as intended at the time of the extruding/molding of a honeycomb structure. The other preparation way is to form a new die having the intended slits so as to have a honeycomb structure having a predetermined shape inclusive of the void portions in the predetermined crossing portions of the partition walls.

In the present method, simultaneously with the extruding/molding of the honeycomb structure, the void portions can be formed. Therefore, this method is preferable from viewpoints of ease and economic efficiency, for example, as compared with a method of preparing a usual honeycomb structure including no void portion and subsequently forming the void portion by means such as mechanical processing.

An exhaust gas purification system according to a third aspect of the invention is constituted using the honeycomb structure according to the first aspect of the invention, and is used for a purpose of trapping/collecting/removing the particulates (particulate materials) containing carbon as a major component included in dust-containing fluids such as the exhaust gas of the internal combustion engine. This system includes: the honeycomb structure for use as the filter for trapping/collecting the particulates according to the first aspect of the invention; and heating means for burning the particulates trapped/collected by the honeycomb structure to regenerate the filtering capacity.

In this system, the void portions of the honeycomb structure are substantially closed by the trapping/collecting and depositing of the particulates, however, the closed void portions is reopened by burning particulates with heating the filter at the time of the regeneration, and at least some of unburnt materials such as ashes deposited in the honeycomb structure are discharged from the honeycomb structure with the flow of the dust-containing fluids, when the void portions are reopened.

As the heating means of the system, it is preferable to use any one of an electric heater, a burner using a gas or liquid fuel, a microwave generation apparatus, and heating means for discharging unburnt fuel components in the exhaust gas of the internal combustion engine and for burning the unburnt fuel components by a catalytic reaction to raise an exhaust gas temperature.

EXAMPLES

The present invention will be described hereinafter in more detail based on examples, but the present invention is not limited to these examples in any means.

[Change of Pressure Loss with Elapse of Run Time]

Figure 8A:
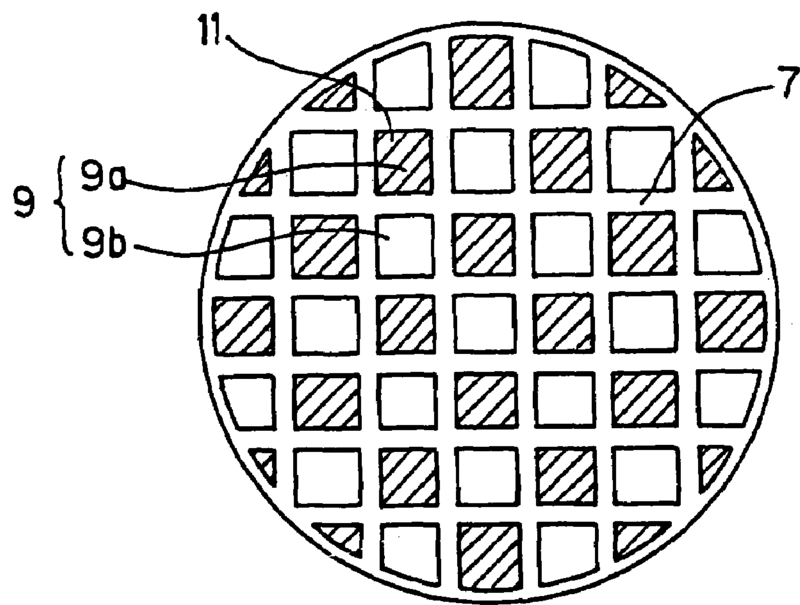
FIG. 8(*a*) and FIG. 8(*b*) show schematic explanatory views showing a basic structure of the honeycomb structure for use as a conventional filter, FIG. 8(*a*) is a plan view seen from one end face side, and FIG. 8(*b*) is a sectional view.
Figure 8B:
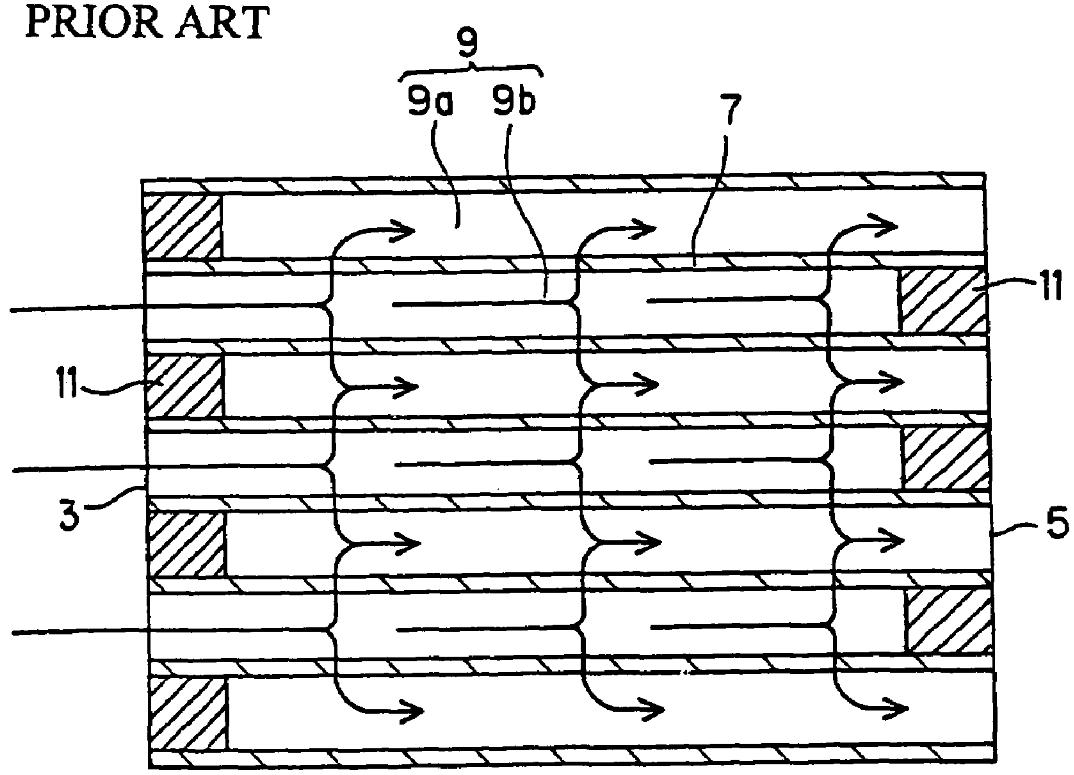

A honeycomb structure having a diameter of 144 mm, a length of 152 mm, a partition wall thickness of 0.3 mm, and a cell density of 46/cm$^2$ was used to prepare a diesel particulate filter (DPF) of the conventional structure in which one end of the through channels was plugged by the plugging portion as shown in FIG. 8(*a*) and FIG. 8(*b*).

This DPF was mounted in an exhaust system of an in-line four-cylinder common rail type direct-injection diesel engine having a displacement of 2000 cc, and the trapping/collecting of the particulates and the regeneration were repeatedly carried out. It is to be noted that in the regeneration of the DPF, the fuel injected into an engine combustion chamber by post injection was burnt by a honeycomb type oxide catalyst disposed upstream the DPF, and the particulates deposited in the DPF were burned by the generated heat.

Figure 9:
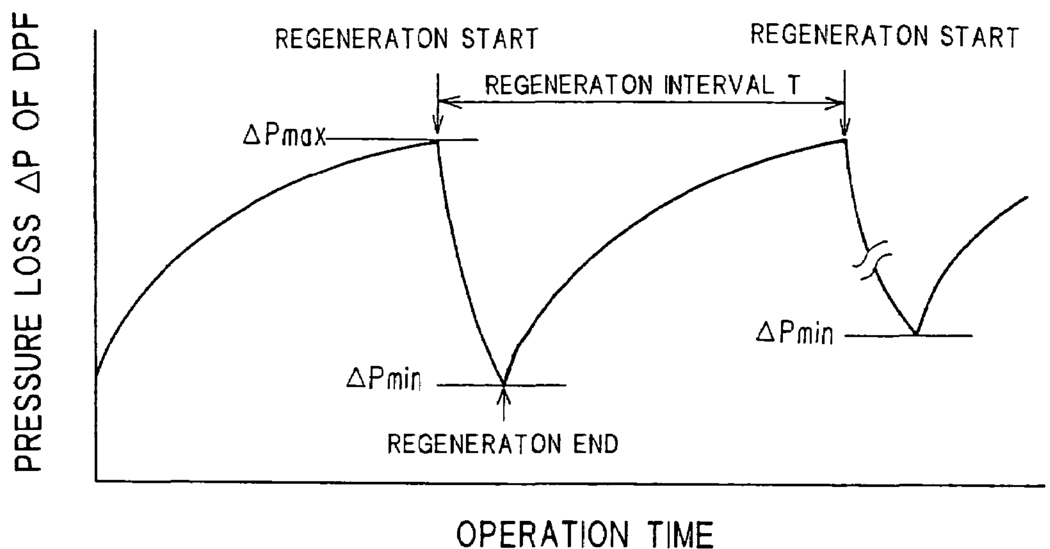
FIG. 9 is a graph showing changes of pressure loss of DPF by a run time in a case in which particulates are repeatedly trapped/collected to regenerate the filter.

FIG. 9 shows changes of the pressure loss of DPF by a run time in a case in which the particulates are repeatedly trapped/collected to regenerate the filter. First, with an elapse of run time (with the trapping/collecting of the particulates), the pressure loss of the DPF rises. When the loss reaches preset $\Delta P_{max}$, the regeneration of the DPF is started. After a given time, the regeneration is ended. At this time, the pressure loss drops to $\Delta P_{min}$. Thereafter, the trapping/collecting of the particulates are started again.

When the steps of the trapping/collecting and the regenerating are repeated, and when the DPF is always completely regenerated at the time of the regeneration, $\Delta P_{min}$ does not change. However, in the DPF including the conventional structure, $\Delta P_{min}$ gradually rises by the deposition of unburnt components by the use over a long period. By the increase of $\Delta P_{min}$, a period between the regeneration and the next regeneration (regeneration interval=T) gradually shortens, and there occurs a necessity of frequently regenerating the filter. As a result, deterioration of a regeneration system is accelerated, usability such as a restriction on a run condition at the time of the regeneration is deteriorated, or defects such as deterioration of fuel consumption involved in the regeneration are generated. Moreover, in the run with a fixed regeneration interval, both the $\Delta P_{min}$ and $\Delta P_{max}$ rise, and therefore engine capability is deteriorated.

[Presence/Absence of Void Portion and Trapping/Collecting Efficiency]

The honeycomb structure having the diameter of 144 mm, length of 152 mm, partition wall thickness of 0.3 mm, and cell density of 46/cm$^2$ was used to prepare a DPF (the void portions are not formed) including the conventional structure in which one end of the through channel was plugged by the plugging portion as shown in FIG. 8(*a*) and FIG. 8(*b*). Similarly, a DPF according to the present invention was prepared in which one end of the through channel was plugged by the plugging portion and the void portions were formed as shown in FIG. 1.

These two DPFs were mounted respectively in the exhaust system of the common rail type direct-injection diesel engine in the same manner as described above, the particulates were trapped/collected, and changes of the trapping/collecting efficiency with the elapse of the run time were checked. It is to be noted that for the trapping/collecting efficiency, a part of the exhaust gas was sucked and passed through filter paper, and a mass of soot in the exhaust gas, attached onto the filter paper, was measured and obtained by the following equation.

$$\text{Trapping/collecting efficiency (\%)}=\{1-(\text{soot mass in DPF downstream})/(\text{soot mass in DPF upstream})\}\times 100 \quad \text{[Equation 1]}$$

Figure 10:
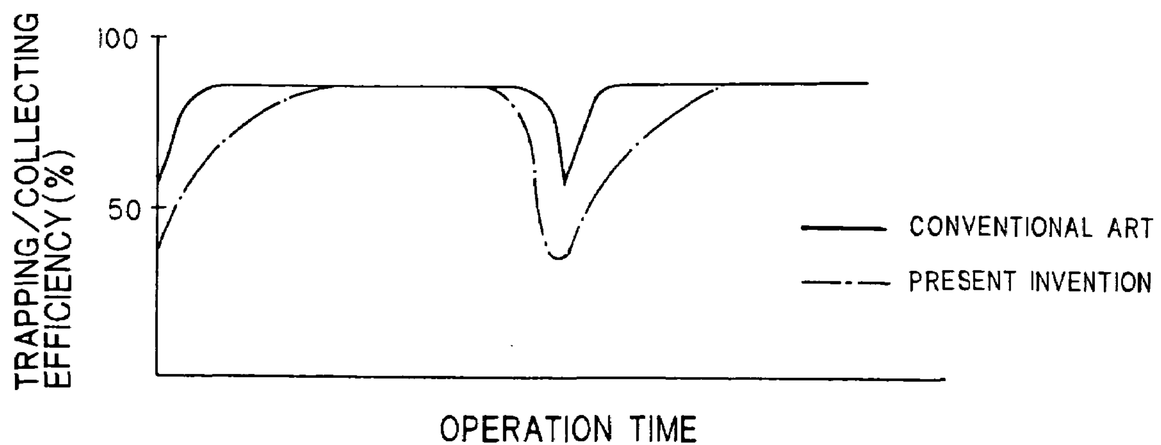
FIG. 10 is a graph showing changes of a trapping/collecting efficiency with the elapse of the run time.

Results are shown in FIG. 10. Even in the DPF having the conventional structure in which no void portions are formed, the trapping/collecting efficiency immediately after the particulates start to be trapped/collected is low. The trapping/collecting efficiency tends to rise with the increase of the trapped/collected amount with the elapse of time. On the other hand, in the DPF according to the present invention in which the void portions are formed, the exhaust gas flows out of the void portions as such. Therefore, the trapping/collecting efficiency immediately after the trapping/collecting starts is lower than that of the DPF including the conventional structure. However, when the void portions are closed by the deposited particulates, the trapping/collecting efficiency accordingly moderately rises. When the void portions are completely closed, the trapping/collecting efficiency thereof becomes equal to that of the conventional DPF.

[Gap Width of Void Portion and Trapping/Collecting Efficiency]

The honeycomb structure having the diameter of 144 mm, length of 152 mm, partition wall thickness of 0.3 mm, and cell density of 46/cm$^2$ was used to prepare DPFs in which the void portions having various gap widths of 0 mm (the void portion is not formed) to 1.2 mm were formed.

These DPFs were mounted respectively in the exhaust system of the common rail type direct-injection diesel engine in the same manner as described above, the particulates were trapped/collected, and a relation of the gap width of the void portion and the trapping/collecting efficiency in a given run time was checked.

Figure 11:
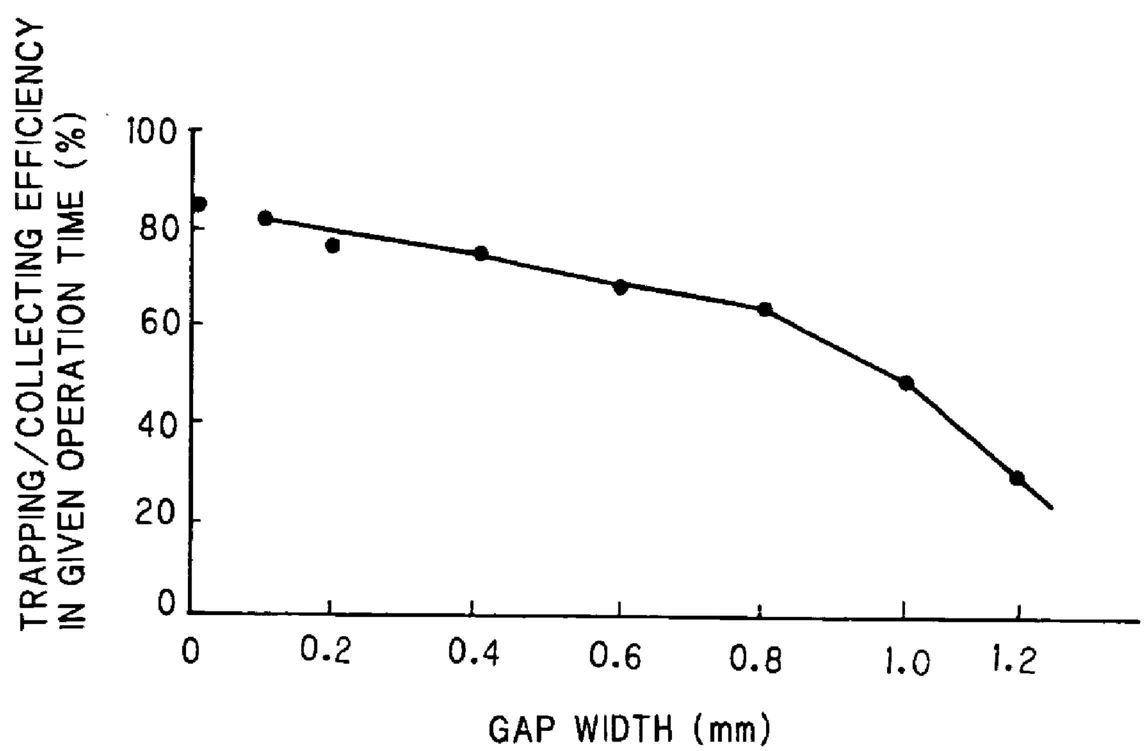
FIG. 11 is a graph showing a relation between the gap width of the void portion and the trapping/collecting efficiency in a given run time.

Results are shown in FIG. 11. With the increase of the gap width of the void portion, the trapping/collecting efficiency gradually drops. However, even with the gap width of 0.8 mm, a practically sufficient trapping/collecting efficiency of 65% is attained (it is to be noted that when the void portion is not formed (gap width of 0 mm), the efficiency is 85%). When the gap width exceeds 0.8 mm, the trapping/collecting efficiency starts largely dropping. However, even with the gap width of 1 mm, the efficiency is 50%, and this is a practically usable region. With the gap width of the void portion exceeding 1 mm, much time is required until the void portion is closed by the deposited particulates, the trapping/collecting efficiency largely drops, and therefore this width is not practical.

Moreover, when the gap width of the void portion is less than 0.2 mm, the ashes are not sometimes discharged well. Therefore, the width is preferably 0.2 mm or more. Additionally, when the gap width of the void portion is less than 0.4 mm, the ashes are sometimes incompletely discharged in a low-speed run at 1000 rpm or less. On the other hand, when the gap width of the void portion is 0.4 mm or more, the ashes are substantially completely discharged even at the time of idling run, and therefore this width is more preferable.

From above, it can be said that the gap width of the void portion is in a range of preferably 0.2 to 1 mm, more preferably 0.4 to 0.8 mm.

As described above, with the use of a honeycomb structure of the present invention as a filter for trapping/collecting particulates included in an exhaust gas of internal combustion engines such as a diesel engine, different from a related art, it is possible to remove ashes deposited inside without requiring any special mechanism or apparatus or without detaching the filter from the exhaust system. According to a manufacturing method of the present invention, the above-described honeycomb structure can easily and economically be prepared. Furthermore, in an exhaust gas purification system of the present invention, with the use of the honeycomb structure as the filter, it is possible to easily remove the ashes deposited in the filter.

What is claimed is:

1. A honeycomb structure comprising:

a plurality of through channels extending to an axial direction of a honeycomb structure, porous partition walls separating through channels from one another, and a plurality of plugging portions plugging at least one of a first end and a second end of the plurality of through channels, predetermined ones of the plurality of through channels being plugged by said plugging portions at the first end and other ones of the plurality of through channels being plugged by said plugging portions at the second end, wherein at least a part of predetermined crossing portions of the porous partition walls is discontinued to form a void portion in the predetermined crossing portions, the void portions extending along a length direction and the length direction extending substantially from the first end to the second end.

2. The honeycomb structure according to claim 1, wherein the void portions are formed along a whole length of the honeycomb structure at predetermined positions at a regular interval.

3. The honeycomb structure according to claim 1, wherein a gap width of the void portion is in a range of 0.2 to 1 mm.

4. The honeycomb structure according to claim 1, wherein a gap width of the void portion is in a range of 0.4 to 0.8 mm.

5. The honeycomb structure according to claim 1, wherein a gap width of the void portion at the vicinity of an outer peripheral portion of the honeycomb structure is larger than that of the void portion in a central portion seen from one of end faces of the honeycomb structure.

6. The honeycomb structure according to claim 1, wherein a thickness of the partition wall having no void portion and extending without having discontinued portion in a predetermined direction is larger than that of the partition wall having the void portion and a discontinued portion defined by the void portion in a section of the honeycomb structure crossing at right angles to the length direction.

7. The honeycomb structure according to claim 6, wherein the thickness of the partition wall having no void portion and extending without having a discontinued portion in the predetermined direction is 1.05 to 1.5 times that of the partition wall having the void portion and the discontinued portion defined by the void portion in the section of the honeycomb structure crossing at right angles to the length direction.

8. The honeycomb structure according to claim 6, wherein the thickness of the partition wall having no void portion and extending without having a discontinued portion in the predetermined direction is 1.1 to 1.3 times that of the partition wall having the void portion and a discontinued portion defined by the void portion in the section of the honeycomb structure crossing at right angles to the length direction.

9. The honeycomb structure according to claim 1, wherein a sectional shape of the through channel is any one of a triangular shape, a quadrangular shape, a hexagonal shape, and a circular shape.

10. The honeycomb structure according to claim 1, wherein a sectional shape of the through channel is a quadrangular shape, the void portion is regularly formed at every other crossing portion of partition walls disposed adjacent to one another, and only one gap is formed by the void portion in each of predetermined through channels.

11. The honeycomb structure according to claim 1 is used as a filter for trapping/collecting/removing particulate materials included in dust-containing fluids such as an exhaust gas of an internal combustion engine by virtue of a filterability of the partition walls.

12. The honeycomb structure according to claim 1, wherein the honeycomb structure is made of a material, as a major crystal phase, containing any one selected from the group consisting of cordierite, silicon carbide, silicon nitride, alumina, mullite, and LAS.

13. The honeycomb structure according to claim 1, wherein the predetermined ones of the plurality of through channels are alternatively arranged with the other ones of the plurality of through channels.

* * * * *